United States Patent [19]

Shtipelman

[11] Patent Number: 4,775,907

[45] Date of Patent: Oct. 4, 1988

[54] RADIAL ACCESS MECHANISM FOR DISK RECORDING/PLAYBACK APPARATUS

[75] Inventor: Boris A. Shtipelman, Rochester, N.Y.

[73] Assignee: Eastman Kodak Company, Rochester, N.Y.

[21] Appl. No.: 136,072

[22] Filed: Dec. 21, 1987

[51] Int. Cl.⁴ .............................................. G11B 5/55
[52] U.S. Cl. .................... 360/106; 74/89.22
[58] Field of Search ............. 360/106; 74/89.2, 89.22; 369/222

[56] References Cited

U.S. PATENT DOCUMENTS 3,932,045  1/1976  Hillberry ................. 74/89.22 X
4,614,989  9/1986  Kaczeus .................. 360/106

Primary Examiner—A. J. Heinz
Attorney, Agent, or Firm—Warren W. Kurz

[57] ABSTRACT

A radial access mechanism for translating, for example, the optical read/write head of an optical recording/playback apparatus relative to a rotating data storage disk to position such head adjacent a desired data track. Such mechanism basically comprises a stationary guide member defining a segment of a circular path, a roller having a head-supporting access arm rigidly coupled thereto, and means for causing the roller to roll, without slipping, on the inside of the circular path defined by the guide member. By virtue of its design, the mechanism inherently functions to translate the head along a hypotrochoidal trajectory.

5 Claims, 3 Drawing Sheets

RADIAL ACCESS MECHANISM FOR DISK RECORDING/PLAYBACK APPARATUS

BACKGROUND OF THE INVENTION

The present invention relates to so-called radial access mechanisms for moving, for example, the read/write head of an optical, magneto-optical or magnetic recorder in a generally radial direction relative to a spinning data storage disk so as to access each of the data storage tracks on the disk. More particularly, it relates to a bearingless and backlash-free radial access mechanism which moves a read/write head along a hypotrochoidal trajectory.

Radial access mechanisms of the type used in conventional magnetic, magneto-optic, and optical disk drives usually consists of several major parts including a motor with its torque transmitted to a bearing-supported carriage driven along required stationary guides. Such motion of the carriage in a disk drive provides radial displacement of the read/write head while it is traveling from one track to another. Depending upon the existing drive designs, head travel is executed along a straight or circular trajectory. For a straight head motion, both stepping motors and voice coil linear actuators of various designs have been used. With a stepping motor, its rotation is converted into a linear motion by a lead screw, rack and pinion combination, or quite often, by a so-called split band wrapped around the motor output shaft. Stepping motors are also used in circular drive schemes. For a linear head trajectory, the motion of a linear actuator is directly transmitted to the carriage. In most of those cases, regardless of the driving scheme, the head carriage is suspended by a number of bearings or bushings that requires proper alignment and high precision in parts manufacturing. A simplified bearingless drive design would remove such stringent manufacturing requirements and represents the subject of this invention.

SUMMARY OF THE INVENTION

It is an object of this invention to provide an improved radial access mechanism for a disk recording/playback apparatus, a mechanism which is improved from the standpoints that it is simple to manufacture, compact in size, bearingless and backlash-free. This object is achieved by the provision of a radial access mechanism comprising a stationary guide member having a surface defining a segment of a circular path, a roller, means for rolling such roller, without slipping, along the inside of the circular path defined by the guide member, and a load supporting arm rigidly attached to the roller and extending outwardly therefrom.

The invention and its advantages will become more apparent to those skilled in the art from the ensuing detailed description of preferred embodiments, reference being made to the accompanying drawings.

DETAILED DESCRIPTION OF PREFERRED EMBODIMENTS

Figure 1:
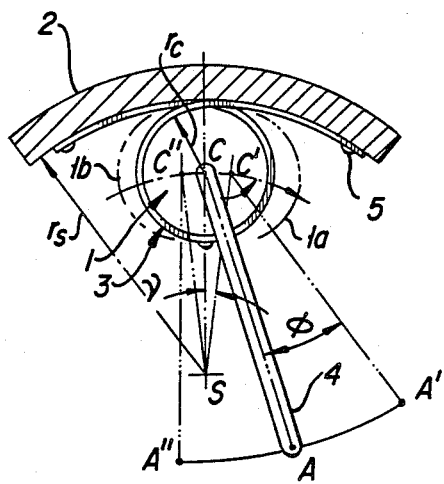
FIG. 1 illustrates a mechanism for translating a load along a hypotrochoidal trajectory.

Referring, to FIG. 1, a hypotrochoidal motion my be generated when a cylindrical roller 1 is moving without slipping along the inside surface of a fixed circular guide or post 2. During such a motion, the roller participates in a planetary movment as being turned about the post center S and rotated about its own center C. Therefore, if an arm 4 is rigidly connected to the roller, its motion to position 1a (or 1b) will result in the arm displacement from its initial location AC to position A'C' (or A"C"). Geometrically, $$\phi = \nu(r_s/r_c - 1)$$

where
 $\phi$ = angular change in the arm position;
 $\nu$ = angle of roller rotation about post center S;
 $r_c$ = roller radius;
 $r_s$ = post radius;

Consequently, any arm point located outside the roller (for instance point A) will trace a prolate (extended) hypotrochoid (curve A'AA"). If a point is picked up inside the roller (at some distance from the center C smaller than radius $r_c$), the described curve will be a curtate (contracted) hypotrochoid. Finally, for a point located on the surface of the roller, the special case of the hypocycloid will arise.

Figure 2:
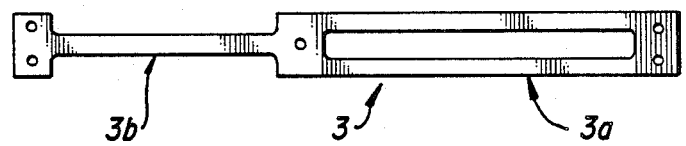
FIG. 2 illustrates a split band coupler used in the FIG. 1 apparatus.

The family of hypotrochoidal curves presents a certain interest since their curvatures may become quite small (i.e. approach a straight line) for a particular combination of geometric parameters. In fact, if the radius $r_s$ is twice larger than the roller radius $r_c$, the hypocycloid becomes a straight line that may represent an ideal tajectory for radial access motion. For any hypotrochoid, of course, the generating circle (roller 1) has to be in constant contact with the inside of the fixed circle (post 2) providing that no slippage occurs. One way of achieving this is to use a non-elastic band, such as the so-called split band 3 shown separately in FIG. 2. The band, which is typically made of metal or plastic, is wrapped around the roller in an alfa-shape fashion by passing the narrow left-hand part 3b through the oblong cutout in the right-hand portion 3a of the band. Each of its both ends then is connected to the post 2 by screws 5. An additional screw may be used to secure location of the band around the roller surface.

For a slipless and backlash-free roller motion along the inside surface of the fixed post, the split band must be put in tension. This requirement, however, may be fulfilled only for a theoretical scheme illustrated in FIG. 1. In reality, the split band will, due to gravitational forces, sag and will not be able to follow the inside shape of the post. To solve this problem, another split band mechanism, illustrated in FIG. 3, is provided.

Figure 3:
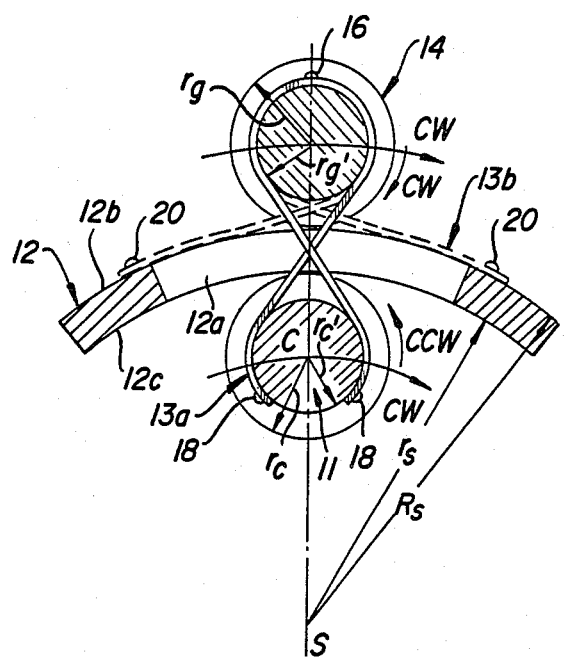
FIG. 3 is a cross-sectional illustration showing a mechanism for causing a roller to move, without slipping along the inside of a circular path.

As FIG. 3 shows, roller 11 is supplemented by an additional supporting roller 14. Each roller has two steps with radii $r_c$, $r_c'$ for roller 11, and radii $r_g$, $r_g'$ for roller 14. The rollers are coupled together by a split band 13a wrapped around steps $r_c'$ and $r_g'$ so that the steps $r_c$ and $r_g$ of rollers 11 and 14 are in contact with the fixed post 12 along its inside and outside surfaces, 12b and 12c, respectively. As sown, in FIG. 3, split band 13a (shown in solid lines) is wrapped around rollers 11 and 14 in an 8-shape form. For that reason, post 12 is provided with an elongated cutout 12a through which the 8-shaped band passes. After the mid portion of the band and roller 14 are connected together, such as by a screw 16, each band end is made taut and anchored to roller 11 (e.g. by screws 18 or any other means).

To balance the contact between the roller and post surfaces, each roller in its axial section may have a C-shape with one step of a smaller radius and two outside steps of a larger radius. If those larger steps embrace the fixed post, the undesired degree of freedom related to the axial roller motion will be eliminated.

When both rollers participate in a planetary motion with a circular movement about post center S (for instance, in a clockwise rotation as shown in FIG. 3), each of the rollers will rotate in opposite directions (counterclockwise rotation for roller 11 and clockwise rotation for roller 14). These rotations will also have different angular values. For example, if a circular motion about center S is characterized by an angle $v$, roller 11 will turn about its axis C at an angle $v$ $(r_s/r_c)$. Similarly, roller 14 will turn about its own axis at an angle $v$ $(R_s/r_g)$. Here $R_s$ is the radius of the post outside surface.

Described planetary motion without slippage may be executed with the split band unwinding from one roller and winding onto the second one. Obviously, the band motion along the circumference of each roller has to have equal displacements. In other words, $$v (R_s/r_g) r_g' = v (r_s/r_c) r_c'$$

or $$(R_s/r_s)(r_c/r_c')(r_g'/r_g) = 1$$

For a special case when $r_c = r_c'$, the above condition may be rewritten as $$R_s/r_s = r_g/r_g'$$

Figure 4:
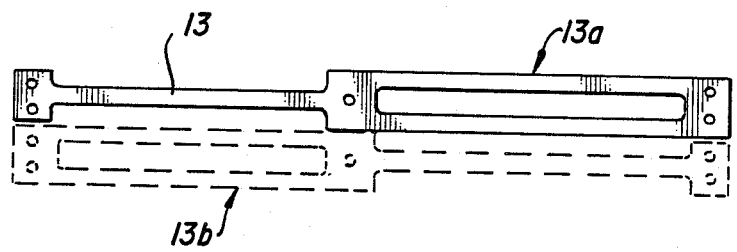
FIG. 4 illustrates a split band coupler used in the FIG. 3 apparatus.

Under heavy shock conditions, some angular sliding of the roller assembly may occur along the fixed post surfaces. To prevent it, the split band configuration may be modified by adding portion 13b shown in FIG. 4 in dotted lines. This portion of the band is provided to be wrapped around roller 14 and anchored, e.g. by screws 20, to the outside surface of the fixed post 12 as illustrated in FIG. 3.

Figure 5:
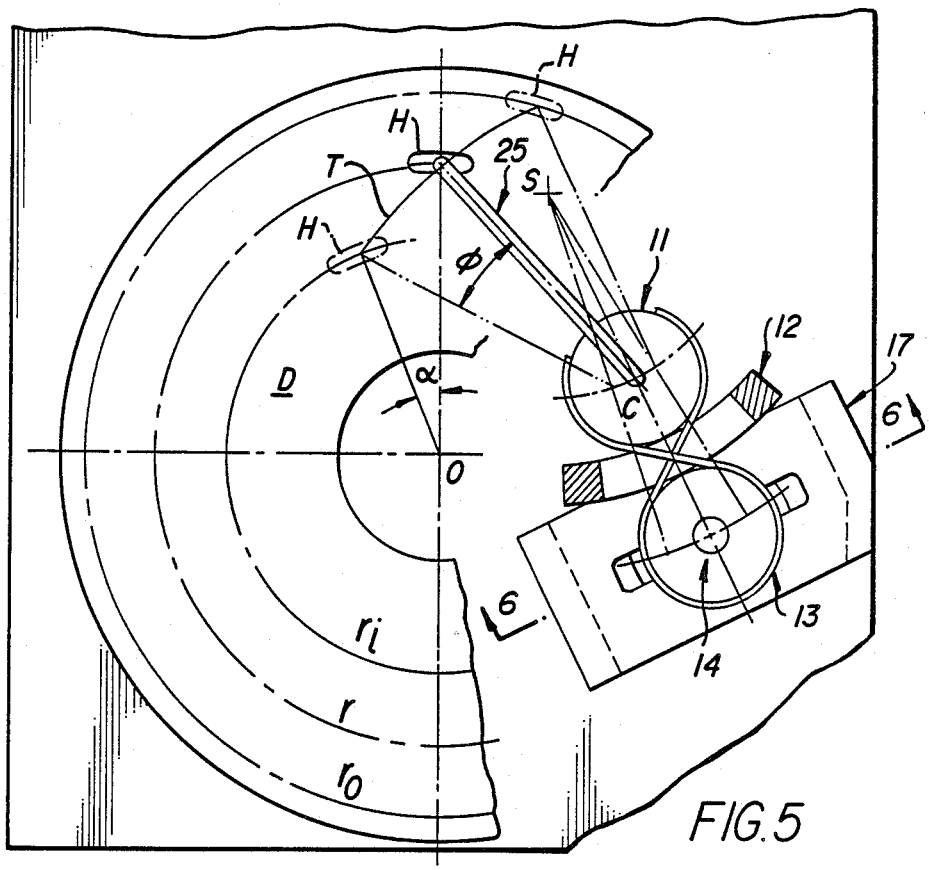
FIG. 5 illustrates in partial cross-section a radial access mechanism for moving a read/write head relative to a data storage disk.
Figure 6:
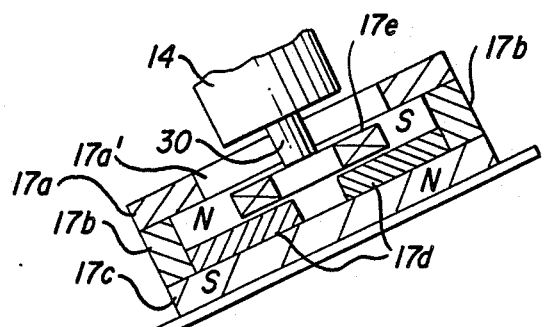
FIG. 6 is a cross-sectional illustration taken along the section line 6—6 of FIG. 5.

The implementation of the mechanism shown in FIG. 3 as a radial access mechanism in a disk recorder/player is demonstrated in FIG. 5. The radial access mechanism serves to move a read/write head H in the radial direction relative to a data storage disk D by a linear voice coil motor 17, presented in the section view of FIG. 6. Head H is mounted on radial arm 25 and moves along a prolate hypotrochoidal trajectory when rollers 11 and 14 wrapped together by a split band 13 participate in a planetary motion along the inside and outside surfaces of the fixed circular post 12. FIG. 5 illustrates an instant in the mechanism position when head H is located on the disk mean track characterized by a radius r. To move the head to the inside track (radius $r_i$), arm 25 has to be turned counterclockwise at an angle $\phi$. In this case, head H meets the inside track at a point dislocated in an angular direction by the angle $\alpha$. If the geometric parameters of the actuator and its position related to the disk center O are defined in such a way so that angles $\phi$ and $\alpha$ are equal to each other, head orientation at mean and inside tracks will be the same. Obviously, a similar requirement has to be fulfilled for a case when head H is moved to the outside track (radius $r_o$). But in reality, some angular errors in head position as it moves from one track to another may occur. However, such errors can be kept within tolerable limits with values not exceeding $\pm 0.75°$.

Radial motion along trajectory T by the head is effected by a linear voice coil motor 17. Its major components are shown in section 6—6 of FIG. 6. They include steel plates 17a and 17c separated by two steel spacers 17b. Two permanent magnets 17d are mounted on the bottom plate 17c. These magnets are oriented in such a way so that two magnetic circuitries with opposing flux in the air gap are created. In the gap, a round coil 17e is located. This coil is connected to roller 14 by a shaft extension 30 passing through an elongated cutout in plate 17a. As a result, when coil 17e is activated by an electric current, roller 14 will move along the outside circular surface of post 12 and at the same time will turn about its own axis A. However, since coil 17e is a round one, the effective wire length in the air gap as well as the motor force will remain constant.

The invention has been described in detail with particular reference to preferred embodiments thereof, but it will be understood that variations and modifications can be effected within the spirit and scope of the invention.

I claim:

1. Apparatus for controlling the radial position of a read/write head relative to a rotating data-storage disk in a disk recorder/player, said apparatus comprising:
   (a) a guide member having a concave surface defining a circular path;
   (b) a first roller positioned with its arcuate surface on said path;
   (c) means for causing said first roller to roll, without slipping, along said concave surface; and
   (d) an elongated arm rigidly coupled to said roller, a portion of said arm extending outwardly from said roller and being adapted to support a read/write head.

2. The apparatus as defined by claim 1 wherein said causing means comprise as elongated band having an intermediate portion wrapped about said roller and first and second end portions, on opposite sides of said intermediate portion, which are affixed to said path defining means.

3. The apparatus as defined by claim 2 wherein said band has an aperture formed in one end portion thereof, the other end portion extending through said aperture when said band is wrapped about said roller.

4. The apparatus as defined in claim 1 wherein said path defining means comprises an arcuate member having spaced parallel, surfaces defining juxtaposed concave and convex circular surfaces, said first roller being positioned to roll along said concave circular surface, and wherein said causing means comprises (a) a second roller positioned to roll along said convex circular surface and (b) means for rigidly coupling said first and second rollers so that rotational movement of said first roller along said concave circular surface produces rotational movement of said second roller along said convex circular surface.

5. The apparatus as defined by claim 4 wherein said coupling means comprises an elongated band rigidly connected to said first and second rollers and having an intermediate portion wrapped around said first roller.

* * * * *